United States Patent [19]

Liedenbaum et al.

[11] Patent Number: 5,625,727
[45] Date of Patent: Apr. 29, 1997

[54] UNIT FOR MODULATING AN OPTICAL PULSE SERIES IN CONFORMITY WITH A DATA SIGNAL

[75] Inventors: Coen T. H. F. Liedenbaum; John J. E. Reid, both of Eindhoven, Netherlands

[73] Assignee: U.S. Philips Corporation, New York, N.Y.

[21] Appl. No.: 611,156

[22] Filed: Mar. 5, 1996

[30] Foreign Application Priority Data

Mar. 15, 1995 [EP] European Pat. Off. .............. 95200620

[51] Int. Cl.$^6$ ..................................................... G02B 6/35
[52] U.S. Cl. ........................... 385/16; 359/173; 359/188; 385/24
[58] Field of Search ........................ 385/1, 4, 5, 15, 385/16, 24, 27; 359/127, 154, 173, 180, 188

[56] References Cited

U.S. PATENT DOCUMENTS 5,151,818  9/1992  Thijs et al. ............................. 359/344
5,155,779  10/1992  Avramopoulos et al. ................ 385/24

OTHER PUBLICATIONS

Sokoloff et al., "Performance of a . . . A Terahertz Optical Asymmetric Demultiplexer (TOAD)", IEEE Photonics Technology Letters, vol. 6, No. 1, Jan. 1994. pp. 98–100.

Dolfi, "High–Speed Devices and Subsystems", OFC '94 Technical Digest, pp. 74–75, Paper WBI, 1994 [no month].

Doran et al., "Nonlinear–optical loop mirror", Optics Letters, vol. 13, No. 1, Jan. 1988, pp. 56–58.

Primary Examiner—John D. Lee
Attorney, Agent, or Firm—Richard A. Weiss

[57] ABSTRACT

The invention relates to an optical unit for generating an optical data signal in conformity with a data pattern. The unit has an input for receiving the data pattern with a modulation period T, a pulsed laser for supplying an optical pulse series having a pulse period n.T and a pulse duration $\tau$, in which n is an integer, and a converting unit for converting this pulse series into an optical data signal in conformity with the data pattern. The converting unit is a radiation-controlled optical switch. This switch has a first input for receiving the data pattern in the form of an optical pulse series whose pulses have a pulse width b, a second input for receiving the optical pulse series from the pulsed laser for sampling the data pattern during periods when the switch is open, and an output for supplying a data pulse series having a pulse width $\epsilon.b$, in which $0 < \epsilon < 1$.

16 Claims, 2 Drawing Sheets

UNIT FOR MODULATING AN OPTICAL PULSE SERIES IN CONFORMITY WITH A DATA SIGNAL

BACKGROUND OF THE INVENTION

The invention relates to an optical unit for generating an optical data signal in conformity with a data pattern, said unit having an input for receiving the data pattern with a modulation period T, a pulsed laser for supplying an optical pulse series having a pulse period n.T and a pulse duration τ, in which n is an integer, and means for converting said pulse series into an optical data signal in conformity with the data pattern.

The invention also relates to an optical transmission system and a transmitter including such a unit.

An optical unit of the type described in the opening paragraph may be used, for example in the transmitter of optical telecommunication systems. In such systems, a digital electric data signal is converted in the transmitter into an optical pulse pattern by modulating the radiation from a laser in the transmitter in conformity with the data signal to be transmitted. Subsequently, the formed series of optical pulses can be transported via, for example an optical fibre to an optical receiver in which it is converted again into a digital electric signal.

In present-day telecommunication systems the aim is, inter alia an increased data transmission rate. This requires optical data pulse series consisting of short pulses. However, optical pulse series consisting of short pulses are relatively difficult to modulate with data.

One of the possibilities of generating a pulse series consisting of short optical pulses and having a pulse pattern in conformity with a data pattern to be transmitted is what is commonly referred to as gain-switching of the laser. In this method a short current pulse is applied to the laser in the case of a digital "1", whereupon the laser in its turn transmits a short optical pulse. However, the following problem then presents itself. To obtain said short pulses, the modulation of the current through the laser should be such that each optical pulse is generated only by the relaxation oscillation of the laser, rather than by the length of the current pulse. The laser oscillation is determined by the charge carrier density and the photon density in the laser medium. The supply of a data pattern, in other words a succession of digital zeros and ones, to the laser means that different current patterns are applied to the laser. These current patterns cause different charge carrier densities in the laser medium. For example, after a number of digital ones has successively been applied to the laser, the charge carrier density will be different than after a succession of a number of zeros. As a result, the shape of the optical pulses will vary. Not only the shape, but also the instant when the optical pulse is formed will be varied so that time jitter is produced. Time jitter is understood to mean that the pulse position is defined inaccurately with respect to the pulse period.

As a result of the phenomena mentioned above, the pulse pattern of the optical data pulse series thus formed no longer corresponds entirely to the original data pattern.

Another manner of generating an optical pulse series consisting of short optical pulses and having a pulse pattern in conformity with a data pattern to be transmitted is the modulation of a pulse series obtained via mode-locking with the aid of an external modulator driven by the data signal to be transmitted. An example thereof is described in the article: "Monolithic semiconductor soliton transmitter" by P. B. Hansen et al. in OFC '94 Technical Digest, pp. 74–75.

The drawback of the use of such a modulator, for example of the electro-absorptive type, for applying a data signal to an optical pulse series is that the electric voltage required by the modulator for obtaining a sufficiently high extinction ratio is relatively high. The extinction ratio is the ratio between the light intensity of a digital "1" and the light intensity of a digital "0". In order that a clear distinction can be made between a "0" and a "1", this ratio should be sufficiently high. Particularly at high transmission rates, this may lead to problems because the modulation frequency increases in this case, and with an increasing modulation frequency the required extinction ratio is relatively difficult to achieve as a result of non-ideal electric transfer characteristics. Moreover, it is relatively difficult to smooth these transfer characteristics so that no level differences and electrical reflections which, moreover, are relatively difficult to smooth, are produced in the range between the DC level and the maximum modulation frequency. Moreover, such modulators are very expensive and the modulation frequency is limited to 10–20 GHz, which is too low for the desired transmission rates.

SUMMARY OF THE INVENTION

It is an object of the invention to provide a unit for modulating an optical pulse series in which a data pattern to be transmitted can be applied substantially without errors to an optical pulse series consisting of short pulses which can be transported at a relatively high transmission rate, and which unit is also relatively simple and inexpensive.

To this end, the optical unit for modulating an optical pulse series according to the invention is characterized in that the means are constituted by a radiation-controlled optical switch having a first input for receiving the data pattern in the form of an optical pulse series whose pulses have a pulse width b, a second input for receiving the optical pulse series from the pulsed laser for sampling the data pattern during periods when the switch is open, and an output for supplying a data pulse series having a pulse width ε.b, in which 0<ε<1.

The period when the switch is open determines the time interval in which the pulses with pulse width b are sampled and consequently the width ε.b, in which 0<ε<1, of the pulses generated at the output of the switch. The advantage is that the factor ε and hence the width ε.b can be chosen by adapting the opening time of the switch.

Every time, a sample of a pulse of the data pulse series applied to the first input is obtained at the output of the switch and has a length covering the opening time of the switch.

Since only a sample of the data pulses is taken, an NRZ-modulated laser may be sufficient for the laser which is modulated with the digital data pattern. Such a laser has relatively broad pulses but these pulses have a relatively high extinction ratio. Moreover, the pulses have a large spectral purity under modulation which is a great advantage with respect to dispersion. When sampling the data pattern, the intensity of the data pulses can be amplified or attenuated, but the extinction ratio remains at least as large.

By using a radiation-controlled optical switch, an NRZ-modulated data pulse series consisting of broad pulses and having a high extinction ratio is thus converted into a modulated data pulse series consisting of relatively short pulses having substantially the same extinction ratio.

A further advantage is that the time jitter present in the original data pattern is eliminated, provided that the data pulse is not sampled at the edges.

An embodiment of the optical unit according to the invention is characterized in that the optical switch is constituted by an optical waveguide structure having at least one non-linear optical portion whose refractive index is variable by means of radiation intensity, the first input and the output of the switch being interconnected by means of a directional coupler.

The directional coupler splits the data pulse series applied to the first input into two sub-signals. These sub-signals will both propagate to the output of the switch, but in opposite directions. By injecting a pulse series into the waveguide structure via the second input, an asymmetry in the waveguide structure is produced so that a phase difference between the two sub-signals propagating in opposite directions will occur at the output of the switch. This phase difference $\Delta\phi$ is proportional to $n_2.I.L_{int}$. In this expression, $n_2$ is the non-linear coefficient of the non-linear optical portion, I is the optical intensity at the interaction and $L_{int}$ is the interaction length which is at most equal to the length of the non-linear optical portion. When the phase difference between the two sub-signals is large enough, there will be constructive interference at the output and the switch will be open. The signal at the output is maximal when the phase difference is equal to $\pi$. During the time intervals when the switch is open, the pulses of the data pulse series appear at the output and their width is determined by the time interval when the switch is open and is determined by other parameters, dependent on the configuration of the switch.

The waveguide structure may be provided with, for example polarization-controlling elements so as to ensure that the two sub-signals at the output have the suitable polarization to realise constructive interference at a sufficiently large phase difference.

Moreover, by means of these polarization-controlling elements, it can be ensured that the switch operates in the opposite sense, in other words, that it is open in the absence of asymmetry in the waveguide structure and is closed in the presence of asymmetry in the waveguide structure.

A further embodiment of the optical unit according to the invention is characterized in that the waveguide structure is a non-linear optical fibre whose ends constitute at least the first input and the output, and in that the second input is present between the first input and the output, the intensity of the radiation from the pulsed laser causing asymmetry in the waveguide structure.

In this case, use is made of the optical non-linearity of optical fibres.

An optical switch whose waveguide structure consists of a non-linear optical fibre may be, for example a NOLM (Non-linear Optical Loop Mirror). It is a known switch which is described in, for example the article: "Non-linear Optical Loop Mirror" by N. J. Doran and D. Wood in Optics Letters, Vol. 13, No. 1, January 1988. The waveguide structure in the form of a glass fibre ring is obtained by interconnecting the two ends of a directional coupler, for example a 50:50 coupler. In this way, two gates which may function as input and output are formed on the ring. When a signal is sent into the ring via the input gate, this signal will be split up into two equal signal portions by the directional coupler, which signal portions will pass through the ring in opposite directions and will recombine in the coupler. Dependent on the relative phases of the two sub-waves, a pulse may appear either at the input gate, in the case of destructive interference, or at the output gate, in the case of constructive interference, due to interference between the two sub-waves in the directional coupler. The relative phases of the two sub-waves are influenced by causing an asymmetry in the ring. In this embodiment this is the injection of the control pulses at an asymmetrical position in the ring. In this case, use is made of the optical non-linear property of a glass fibre, i.e. the refractive index is dependent on the optical intensity in this fibre. The injected radiation causes a phase change in the sub-signal which propagates in the same direction as the control pulse so that a phase difference is produced between the two sub-signals propagating in opposite directions. At a phase difference which is equal to $\pi$, the intensity measured at the output gate will be maximal. The presence or absence of a control pulse allows the ring to switch between transmission and mirror modes.

The phase difference which is realised between the two sub-signals propagating in opposite directions is determined in the described geometry by the pulse duration $\tau$ of the pulses of the control pulse laser and the dispersion which occurs in the fibre. In fact, in the optical fibre the delay time is different for different wavelengths, which means that in a long fibre there will be a delay time difference between the data signal and the control pulse. The pulse duration $\tau$ can be adjusted in a simple manner, but the dispersion is fixed with the choice of the fibre.

Another embodiment of the optical unit according to the invention is characterized in that the waveguide structure is a non-linear optical fibre whose ends constitute at least the first input and the output, in that the first and the second input coincide, in that the directional coupler is a wavelength-sensitive coupler, and in that the intensity of the radiation from the pulsed laser causes asymmetry in the waveguide structure.

Instead of injecting the radiation from the control pulse laser into the fibre ring via a separate coupler, the 50:50 coupler may be replaced by a wavelength-sensitive coupler, so that the data pulse series to be converted and the control pulse series can be injected into the switch via the same input. In this case, the data signal and the control pulse laser should have such wavelengths that the intensity of the control pulse laser causes asymmetry in the ring. This may be the case, for example, if the control pulse signal is not split up at all into two sub-signals or is split up into two unequal sub-signals, one of which is too weak to have any effect on the sub-signal of the relevant data pulse propagating in the same direction.

An alternative embodiment of the optical unit according to the invention is characterized in that a non-linear optical element is arranged between the first input and the output in the waveguide structure at an asymmetrical position with respect to the centre, and in that the second input is present between the first input and said element.

In this case, the waveguide structure may consist of both a linear optical material and a non-linear optical material. As long as the non-linear coefficient of the non-linear optical element is larger than that of the rest of the waveguide structure, it will be sufficient to use a shorter fibre and lower powers so as to realise the required phase difference between the two sub-signals as compared with the case in which the switch is implemented as a NOLM.

The non-linear optical element should be present at an asymmetrical position with respect to the centre of the distance between the first input and the output in order that asymmetry is caused. The distance between the element and the centre also determines the phase difference to be realised.

The intensity of the pulses at the output of the optical switch may be attenuated or amplified with respect to the intensity of the pulses of the optical data pulse series applied to the first input, dependent on the nature of the non-linear optical element.

A further embodiment of the optical unit according to the invention is characterized in that the non-linear optical element is a semiconductor laser amplifier.

If the waveguide structure is constituted by an optical fibre, this structure is known per se as a TOAD (Terabit Optical Asymmetric Demultiplexer) and is described, for example in the article: "Performance of a 50 Gbit/s Optical Time Domain Multiplexed System Using a Terahertz Optical Asymmetric Demultiplexer" in IEEE Photonics Technology Letters, Vol. 6, No. 1, January 1994, pp. 98–100.

The non-linear optical amplifier is asymmetrically positioned with respect to the centre of the fibre ring. The optical data pulse series to be converted is applied to the input gate of the fibre ring, which pulse series is applied to, for example an NRZ (non-return to zero)-modulated laser. The extinction ratio of such a laser is relatively high and the pulses are relatively broad. Each pulse at the coupler is split up into two sub-pulses which propagate through the ring in opposite directions. One of the two sub-signals propagates in the same direction as the control pulses. The control pulses which are injected into the ring are synchronized with the pulses of the data pulse series in such a way that the control pulse arrives at the amplifier in the time interval between the arrival of the first sub-signal in the amplifier and the arrival of the second sub-signal in the amplifier. The first arriving sub-signal will be amplified by the amplifier and passed. The subsequent control pulse will saturate the amplifier and subsequently the sub-signal propagating in the opposite direction will also be amplified and passed, if it passes after the saturation but before the desaturation period has elapsed. Moreover, it is ensured that the desired effect is achieved. In fact, the amplifier causes a disturbance in the charge carrier density of the amplifier. As a result, there will be a change of the refractive index so that a phase change will occur in the radiation propagating through the amplifier. In this way, there will thus be a phase change in the second sub-signal so that a phase difference is produced between the two sub-signals propagating in opposite directions. If this phase difference is large enough, constructive interference will occur at the output gate. The value of this phase difference is determined in this switch configuration by the distance between the amplifier and the centre of the ring and the pulse duration τ of the control pulses. In this case, both parameters can be adjusted arbitrarily. The centre of the ring is to be understood to mean the position in the ring where the two sub-signals propagating in opposite directions arrive simultaneously.

Since the asymmetry in the ring is mainly determined by an amplifier, it will be sufficient to use much lower powers and a very short fibre length. Consequently, the switch can be integrated with the other electronic components, which contributes to the compactness of the unit.

Another embodiment of the optical unit according to the invention is characterized in that a non-linear optical element is arranged between the first input and the output in the waveguide structure at an asymmetrical position with respect to the centre, and in that the first input and the second input coincide.

In this embodiment, the data signal and the control pulse series should have such wavelengths that the intensity of the control pulse laser causes asymmetry in the waveguide structure.

A preferred embodiment of the optical unit according to the invention is characterized in that the non-linear optical element is a semiconductor laser amplifier.

If the waveguide structure is an optical fibre, this embodiment is an improved version of a TOAD. The advantage of this form of TOAD is that it can be integrated with other electronic components due to the absence of the second coupler, as compared with the TOAD described above, and the short fibre length which is required to achieve the desired effect, as compared with a NOLM.

A further embodiment of the optical unit according to the invention is characterized in that the semiconductor laser amplifier is polarization-insensitive.

An example of such an amplifier is described extensively in, for example U.S. Pat. No. 5,151,818 and in the non-prepublished European Patent Application EP 94203593.2 both in the name of the Applicant. The advantage of the use of such an amplifier is that polarization-controlling elements ensuring that the interfering sub-signals have the suitable polarization upon interference at the output of the optical switch can be dispensed with.

The invention further relates to an optical transmission system comprising a transmitter and a receiver with a transmission medium arranged in between.

In optical telecommunication systems the aim is to achieve higher transmission rates. These rates are, however, bounded by the current bandwidths of the processing electronics, typically of the order of 10 GHz, and also by the possibility of direct modulation of the diode lasers as signal sources. This boundary is also of the order of 10 GHz.

By making use of an optical unit according to the invention in the transmitter of an optical transmission system, the data signal to be transmitted consists of short optical pulses which succeed each other relatively rapidly and whose length and width are Fourier-limited.

If the transmission rate cannot be raised sufficiently by providing the transmitter with an optical unit according to the invention, more than one signal is to be transmitted through a single channel. To this end, different signals should be joined in the same transmission channel at the transmitter end. The different signals can be joined in the same channel at the transmitter end in a completely optical way. To this end, the optical transmission system according to the invention is characterized in that the transmitter is provided with a number of parallel-arranged optical units according to the invention, which number corresponds to a number of signals to be combined, with each first input of the waveguide structure receiving a data pattern, which data patterns are delayed with respect to each other, and in that each second input receives at least a part of the control pulse pattern from one and the same pulsed laser, the data pattern and the control pulse pattern being synchronized with each other per unit.

In this way, and provided that there is a suitable synchronization, each optical unit will supply a pulse series consisting of short optical pulses which are joined by means of a coupler to a single pulse series which can be transmitted through the transmission medium.

These and other aspects of the invention will be apparent from and elucidated with reference to the embodiments described hereinafter.

DETAILED DESCRIPTION OF THE PREFERRED EMBODIMENTS

Figure 1:
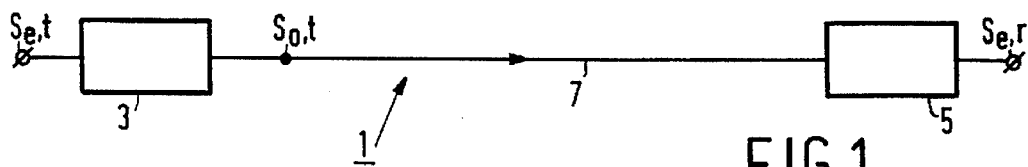
FIG. 1 shows diagrammatically an embodiment of a known optical transmission system.

The transmission system 1 shown diagrammatically in FIG. 1 comprises an optical transmitter 3 and an optical receiver 5 with a transmission medium 7 arranged in between, for example an optical fibre. A data pattern in the form of a digital electric signal $S_{e,t}$ is applied to the optical transmitter 3. This signal is converted in the transmitter 3 into optical pulses $S_{o,t}$. The output of the transmitter 3 is connected to an input of the transmission medium 7, whose output is connected to an input of the receiver 5. After transport of the optical pulses through the transmission medium, the optical pulses in the receiver are convened again into a digital electric signal $S_{e,r}$ which is available at the output of the receiver 5.

In the present invention, the transmitter 3 is provided with an optical unit 9 with which the data pattern to be transmitted is converted substantially without errors and without attenuation into an optical pulse series consisting of short optical pulses which succeed each other relatively rapidly and can be transported substantially without distortion through relatively large distances. To this end, the digital data pattern is first applied to a laser 23 so that, for example an NRZ (non-return to zero)-modulated optical pulse series is obtained. The pulses of this laser 23 are subsequently converted by the optical switch 22 into a modulated pulse series consisting of short pulses in the optical unit 9.

Figure 2A:
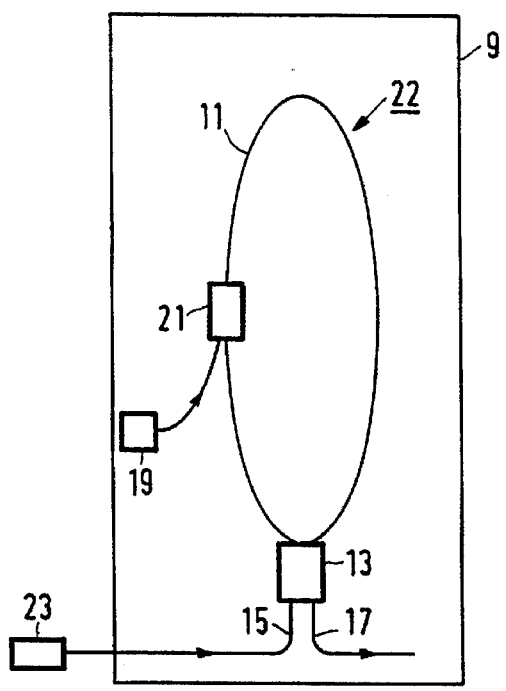
FIGS. 2a and 2b show diagrammatically two embodiments of an optical unit according to the invention.

FIG. 2a is a first diagrammatic representation of an embodiment of such a unit 9. The unit 9 has an optical waveguide structure 11 whose refractive index is variable by means of radiation. The waveguide structure 11 may be an optical fibre which is made of, for example glass or a synthetic material. The embodiment of the waveguide structure shown in the figure is annular. This shape is obtained by coupling the two ends of the fibre via a directional coupler 13, generally a 50:50 coupler. Two gates 15 and 17 functioning as input and output are thus obtained. When a signal is applied to the ring 11 via the input gate 15, this signal will be split up into two equal signal portions by the directional coupler 13, which signal portions will propagate through the ring 11 in opposite directions. The two signal portions will cover the same optical path length so that destructive interference occurs and no intensity will be measured at the output gate 17 if no further measures are taken in the ring 11. All intensity will appear at the input gate. In this case, the waveguide structure 11 operates as a mirror. By ensuring that an asymmetry is caused in the ring 11, it can be realised that a signal is generated at the output gate. In fact, an asymmetry in the ring involves a shift in the relative phases of the two signal portions propagating in opposite directions. In the structure shown in FIG. 2a, this asymmetry is introduced by means of a control pulse laser 19 whose radiation is injected asymmetrically into the ring 11 via an extra coupler 21. These pulses propagate in the same direction as one of the two signal portions. A phase change will consequently occur in said sub-signal so that a phase difference between the two sub-signals will be produced at the output gate and intensity can be measured if the phase difference is large enough because constructive interference will then occur. The value of the phase difference is determined by the length of the fibre, the non-linear coefficient of the fibre and the intensity of the injected radiation. The signal measured at the output gate is maximal at a phase difference which is equal to $\pi$.

Figure 3A:
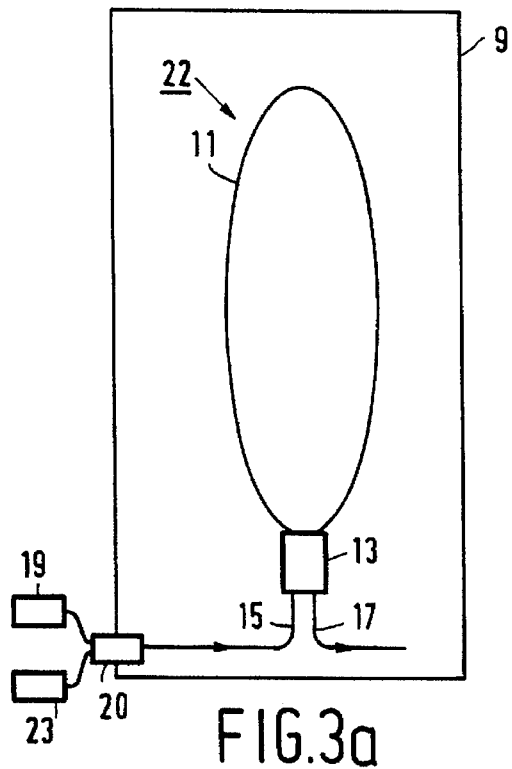
FIGS. 3a and 3b show diagrammatically two embodiments of the optical unit according to the invention, in which the first and the second input of the optical switch coincide.

The asymmetry may also be introduced into the ring 11 by replacing the 50:50 coupler 13 by a wavelength-sensitive coupler and by choosing the wavelengths of the data signal and of the control pulse signal in such a way that the intensity of the control pulse laser causes asymmetry in the ring. In this case, the extra coupler 21 may be dispensed with. FIG. 3a shows an embodiment. The radiation of the lasers 19 and 23 is applied to the optical switch 22 via the coupler 20, but this coupler is arranged outside the switch 22 itself. The first and the second input of the optical switch 22 now coincide.

A sample is thus taken of the pulses of the data pattern in the period when the switch is open, in other words during the period when the phase difference between the two sub-signals propagating in opposite directions is large enough to obtain a signal at the output gate 17. This period is determined by the time during which there is asymmetry in the waveguide structure, in other words, by the width of the pass window of the switch. The pass window is preferably not situated at the edges of the data pulses due to the possible presence of jitter, but in the middle of the data pulses. This also applies to the following embodiments of the optical unit.

In the configurations described and also in the following configurations of optical switches, further polarization-controlling elements may be incorporated in the waveguide structure 11 so as to ensure that the sub-signals interfering at the output of the switch have the suitable polarization for causing constructive interference at a sufficiently large phase difference.

An NRZ-modulated laser may be used as a data laser 23. This may be, for example a DFB laser or an FP laser whose current is modulated or whose radiation is modulated by an electro-absorptive modulator arranged behind the laser 23. The laser 19 is, for example a gain-switched or mode-locked short pulse laser.

The pulses of an NRZ-modulated laser are relatively broad, but have a relatively high extinction ratio. Moreover, the pulses of an NRZ-modulated laser have the advantage of a great spectral purity.

The laser 23 may be either within or outside the optical unit 9.

The embodiments of the waveguide structure described above are known as NOLM (Non-linear Optical Loop Mirror).

The realised phase difference between the two sub-signals propagating in opposite directions in a NOLM is determined by the pulse duration $\tau$ of the control pulses and by the dispersion of the fibre.

Figure 2B:
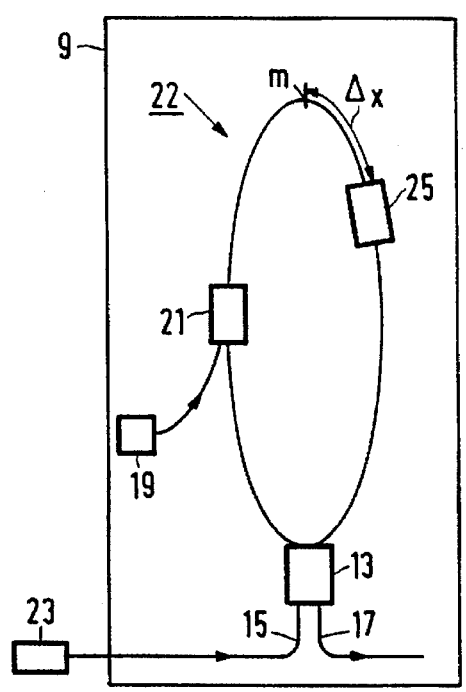

FIG. 2b shows another embodiment of an optical switch for the optical unit according to the invention. FIG. 2b shows a switch as shown in FIG. 2a, in which a non-linear optical element 25 is arranged asymmetrically with respect to the centre m of the ring 11, for example at a distance $\Delta x \neq 0$. The waveguide structure 11 may or may not consist of an optical non-linear material. The asymmetry is now mainly caused by the element 25, provided that the non-linear coefficient of the element is larger than that of the waveguide structure. The element 25 may consist of, for example InP, a polymer or another non-linear optical material. The intensity of the pulses of the pulse series generated at the output of the switch may be attenuated or amplified with respect to the intensity of the pulses of the original data signal, dependent on the non-linear optical element, but an advantage of the present invention is that the extinction ratio is at least maintained during sampling of the data signal to be converted.

In a preferred embodiment of the optical unit according to the invention, the non-linear optical element 25 is a semiconductor laser amplifier. The pulse series coming from the control pulse laser 19 and the data pulse series coming from the laser 23 are synchronized with each other in such a way that a control pulse reaches the amplifier in the interval between the arrival, in the amplifier 25, of the two sub-signals propagating in opposite directions. The first arriving sub-signal will be amplified and passed by the amplifier, the control pulse will saturate the amplifier and subsequently the sub-signal propagating in the opposite direction will also be amplified and passed, if it passes after the saturation but before the desaturation period has elapsed. It is also ensured that the desired effect is achieved. In fact, the saturation of the amplifier is accompanied by a change in charge carrier density. This results in a change of the refractive index. Radiation propagating through the amplifier at that instant will undergo a phase change as a result thereof. A phase change will consequently be introduced in the second sub-signal by the amplifier so that a phase difference is produced between the two sub-signals propagating in opposite directions. If this phase difference is large enough, there will be constructive interference at the output of the switch. Consequently, a modulated pulse pattern of short pulses, in principle having the same extinction ratio as the original data signal, will be produced at the output gate.

The phase difference which is now produced between the two sub-signals propagating in opposite directions is determined by the distance Δx between the amplifier 25 and the centre m of the waveguide structure 11 and by the pulse duration τ of the control pulses. Since the asymmetry is mainly caused by the amplifier, rather than, or to a lesser extent, by the waveguide structure itself, a shorter fibre and a considerably lower power may be sufficient as compared with a NOLM. The switch will be open during a period which is at most equal to the time during which the intensity of the control pulse saturates the amplifier and the subsequent desaturation period of the amplifier.

Also in the case of a TOAD, the coupler 21 in the waveguide structure 11 can be dispensed with so that the first and the second input of the optical switch 22 coincide and both the radiation from the laser 19 and from the laser 23 are applied to the ring 11 via the coupler 13. The radiation from both lasers 19, 23 is joined via a coupler 20 and applied to the coupler 13. The asymmetry may be introduced, for example into the ring 11 by choosing a wavelength-sensitive coupler for the coupler 13 instead of a 50:50 coupler and by choosing the wavelengths of the data signal and of the control pulse signal in such a way that the intensity of the control pulse laser causes asymmetry in the ring. However, the coupler 13 does not need to be a wavelength-sensitive coupler. It is sufficient when the coupler 13 is a coupler ensuring that there is substantially symmetry in the waveguide structure for the control pulses, while there is simultaneously asymmetry of the data pulses. This can be achieved by positioning the amplifier 25 at a suitable position in the waveguide structure, namely at a delay time T/4+w from the centre of the waveguide structure 11, in which T defines the period of the control pulse signal and w defines the pass window of the switch and can be compared with the distance between the amplifier and the centre of the structure 11 in a conventional TOAD. In this way, the wavelengths of the control pulse signal and the data signal do not have to be known in advance.

Figure 3B:
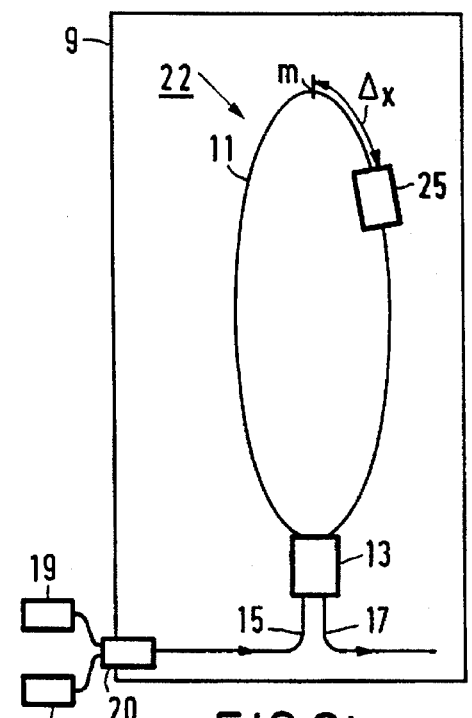

FIG. 3b shows an embodiment of an improved TOAD. This improved version of a TOAD has the advantage that such a component can be integrated with other electronic components because there is one coupler less in the waveguide structure and the fibre length of the ring can also be maintained very short due to the presence of an amplifier. The coupler 20 may alternatively be present outside the optical unit 9.

The optical transmission system may be, for example a multiplex transmission system. In fact, if the transmission rate of a transmission system is to be increased further than can be achieved with a single optical unit according to the invention, more than one signal should be transmitted through a single channel. To this end, several signals are to be joined in the same transmission channel at the transmitter end. The different signals can be joined in one and the same channel at the transmitter end in a completely optical way by providing the transmitter with a number of parallel-arranged optical units 9 corresponding to the number of signals to be combined.

Figure 4:
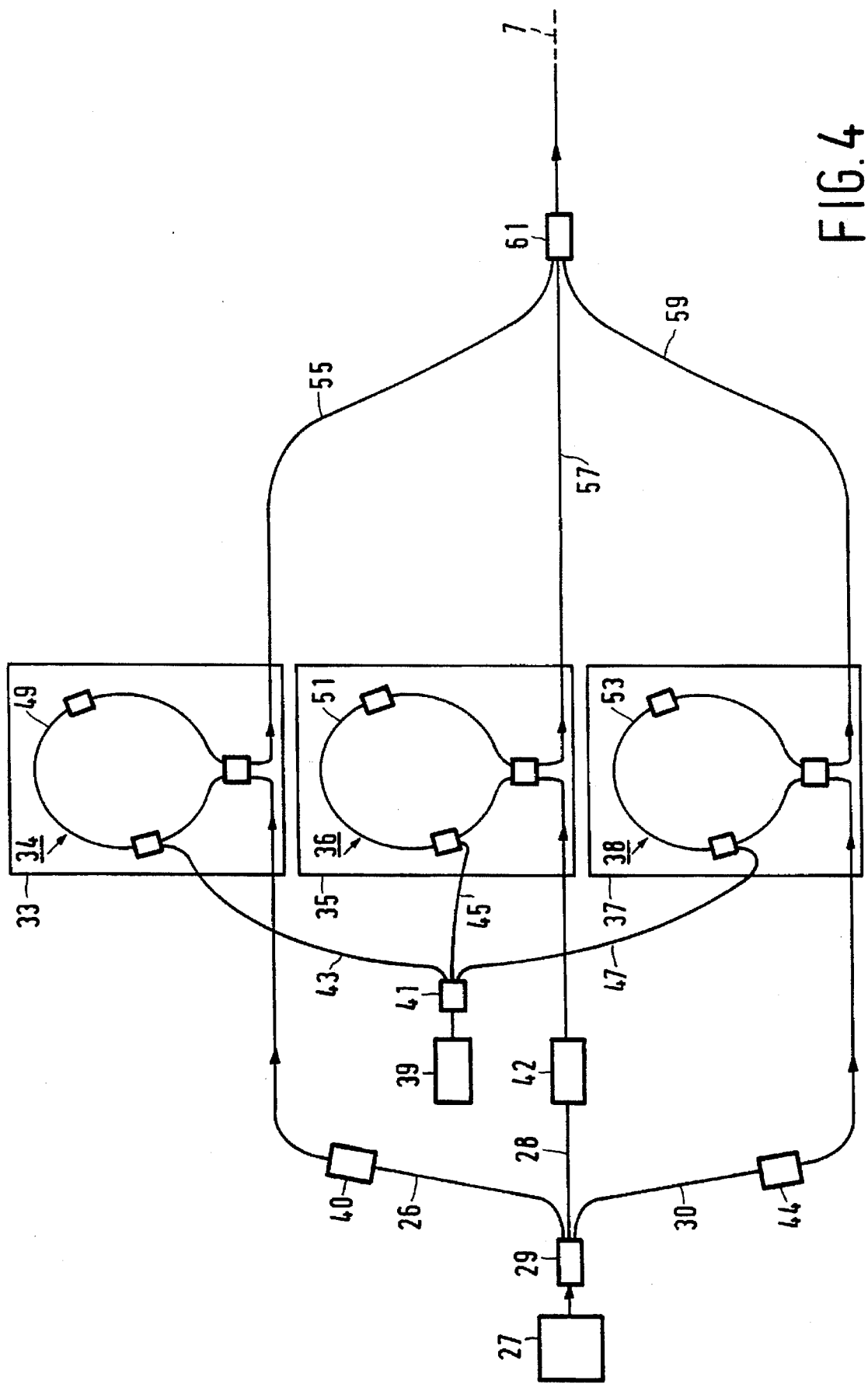
FIG. 4 shows diagrammatically a transmission system whose transmitter comprises more than one unit according to the invention.

FIG. 4 shows such an embodiment. Each unit 33, 35, 37 may be implemented in accordance with one of the embodiments shown in FIGS. 2a, 2b, 3a and 3b.

Laser 27 is, for example a continuously driven laser whose radiation can be transmitted to each of the optical units 33, 35, 37 via the branches 26, 28, 30 with the aid of a coupler 29. Each of these branches incorporates a modulator 40, 42, 44 which converts the radiation into an NRZ-modulated data pulse series in conformity with a data pattern to be transmitted. The different data pulse series are delayed with respect to each other by a suitable factor in order that the data pulse series converted by the switches 34, 36, 38 can be combined to a single signal.

The control pulse series which are applied to each of the optical switches 34, 36, 38 may originate from separately pulsed lasers, but in that case the three lasers should have the same pulse period so as to achieve the envisaged object of high transmission rates. However, the control pulse series applied to the switches preferably originate from one pulsed laser 39. In that case the control pulse series from the laser 39 is also applied with the suitable delay to each of the units 33, 35, 37 via a coupler 41 and three optical fibres 43, 45, 47. The data pulse series and the control pulse series should be synchronized with each other per unit.

In each of the units 33, 35, 37, the NRZ-modulated data pulse series applied thereto is convened into a data pulse series consisting of short pulses. Three optical fibres 55, 57, 59 and a coupler 61 combine these data pulse series of short pulses to one signal whose repetition frequency is triplicated with respect to the original data signals and which can be transmitted through the transmission medium 7 via a single channel.

I claim:

1. An optical unit for generating an optical data signal in conformity with a data pattern, said unit having an input for receiving the data pattern with a modulation period T, a pulsed laser for supplying an optical pulse series having a pulse period n.T and a pulse duration τ, in which n is an integer, and means for converting said pulse series into an optical data signal in conformity with the data pattern, characterized in that the means are constituted by a radiation-controlled optical switch having a first input for receiving the data pattern in the form of an optical pulse series whose pulses have a pulse width b, a second input for receiving the optical pulse series from the pulsed laser for sampling the data pattern during periods when the switch is open, and an output for supplying a data pulse series having a pulse width $\epsilon.b$, in which $0 < \epsilon < 1$.

2. An optical unit as claimed in claim 1, characterized in that the optical switch is constituted by an optical waveguide structure having at least a non-linear optical portion whose refractive index is variable by means of radiation intensity, the first input and the output of the switch being interconnected by means of a directional coupler.

3. An optical unit as claimed in claim 2, characterized in that the waveguide structure is a non-linear optical fibre whose ends constitute at least the first input and the output, and in that the second input is present between the first input and the output, the intensity of the radiation from the pulsed laser causing asymmetry in the waveguide structure.

4. An optical unit as claimed in claim 2, characterized in that the waveguide structure is a non-linear optical fibre whose ends constitute at least the first input and the output, in that the first and the second input coincide, in that the directional coupler is a wavelength-sensitive coupler, and in that the intensity of the radiation from the pulsed laser causes asymmetry in the waveguide structure.

5. An optical unit as claimed in claim 2, characterized in that a non-linear optical element is arranged between the first input and the output in the waveguide structure at an asymmetrical position with respect to the centre, and in that the second input is present between the first input and said element.

6. An optical unit as claimed in claim 5, characterized in that the non-linear optical element is a semiconductor laser amplifier.

7. An optical unit as claimed in claim 6, characterized in that the semiconductor laser amplifier is polarization-insensitive.

8. An optical unit as claimed in claim 2, characterized in that a non-linear optical element is arranged between the first input and the output in the waveguide structure at an asymmetrical position with respect to the centre, and in that the first input and the second input coincide.

9. An optical unit as claimed in claim 8, characterized in that the non-linear optical element is a semiconductor laser amplifier.

10. An optical unit as claimed in claim 9, characterized in that the semiconductor laser amplifier is polarization-insensitive.

11. An optical transmission system comprising a transmitter and a receiver with a transmission medium arranged in between, characterized in that the transmitter is provided with at least one optical unit as claimed in claim 2.

12. An optical transmission system comprising a transmitter and a receiver with a transmission medium arranged in between, characterized in that the transmitter is provided with a number of parallel-arranged optical units of the type claimed in claim 2 in conformity with a number of signals to be combined, in which each first input of the waveguide structure receives a data pattern, which data patterns are delayed with respect to each other, and in that each second input receives at least a part of a control pulse pattern from one and the same pulsed laser, the data pattern and the control pulse pattern being synchronized with each other per unit.

13. A transmitter for use in an optical transmission system, characterized in that the transmitter is provided with at least one optical unit as claimed in claim 2.

14. An optical transmission system comprising a transmitter and a receiver with a transmission medium arranged in between, characterized in that the transmitter is provided with at least one optical unit as claimed in claim 1.

15. An optical transmission system comprising a transmitter and a receiver with a transmission medium arranged in between, characterized in that the transmitter is provided with a number of parallel-arranged optical units of the type claimed in claim 1 in conformity with a number of signals to be combined, in which each first input of the waveguide structure receives a data pattern, which data patterns are delayed with respect to each other, and in that each second input receives at least a part of a control pulse pattern from one and the same pulsed laser, the data pattern and the control pulse pattern being synchronized with each other per unit.

16. A transmitter for use in an optical transmission system, characterized in that the transmitter is provided with at least one optical unit as claimed in claim 1.

* * * * *